United States Patent [19]

Schmidt

[11] Patent Number: 4,736,208

[45] Date of Patent: Apr. 5, 1988

[54] DEVICE FOR MEASURING THE CONTOUR OF A SURFACE ALONG A SCANNING LINE

[75] Inventor: Jorg Schmidt, Dauchingen, Fed. Rep. of Germany

[73] Assignee: Hommelwerke GmbH, Fed. Rep. of Germany

[21] Appl. No.: 940,022

[22] Filed: Dec. 10, 1986

[30] Foreign Application Priority Data

Nov. 5, 1986 [DE] Fed. Rep. of Germany ....... 3543906

[51] Int. Cl.$^4$ ............................ G01B 9/00; G01B 7/28
[52] U.S. Cl. .................................. 346/33 R; 364/560
[58] Field of Search ................ 340/33 R, 33 F, 33 M, 340/33 MC, 33 D; 358/300, 296; 364/560, 562

[56] References Cited

U.S. PATENT DOCUMENTS 4,159,700 5/1985 Barker et al. .................... 358/300 X Primary Examiner—Clifford C. Shaw
Attorney, Agent, or Firm—Allegretti, Newitt, Witcoff & McAndrews, Ltd.

[57] ABSTRACT

A device for measuring the contour of a surface along a scanning line. The device includes an electro-mechanical transducer with a scanner arm on whose free end there is a sensing tip. The other end of the arm is connected, via a pivot bearing whose axis of rotation is parallel to the surface to be scanned and vertical to the scanning line, with an advance mechanism. The advance mechanism moves the pivot bearing along the scanning line. The transducer emits, corresponding to excursions of the sensing tip transverse to the scanning line, a measurement signal that is fed into a recording device. The recording device records the electrical signal on the basis of distance or time. A control device is provided into which the electrical measurement signal is fed. On the basis of the magnitude of the electrical measurement signal, the control device produces an advance or a lag of the advance mechanism or of the time axis of the recording device relative to the advance of the advance mechanism. The advance or lag is in a degree and a direction that correspond to the movement of the scanning point in the advance direction relative to its pivot bearing in the case of excursions essentially vertical to the direction of advance. In this way, measurement errors caused by excursions of the scanning arm are substantially suppressed.

8 Claims, 3 Drawing Sheets

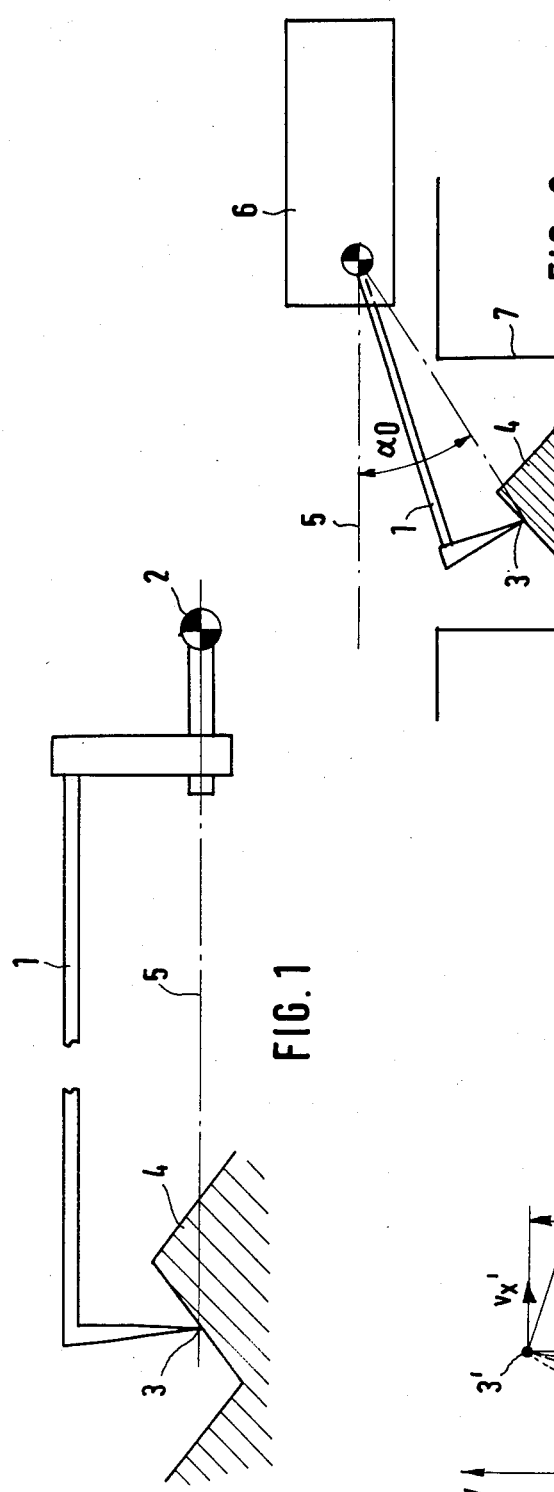
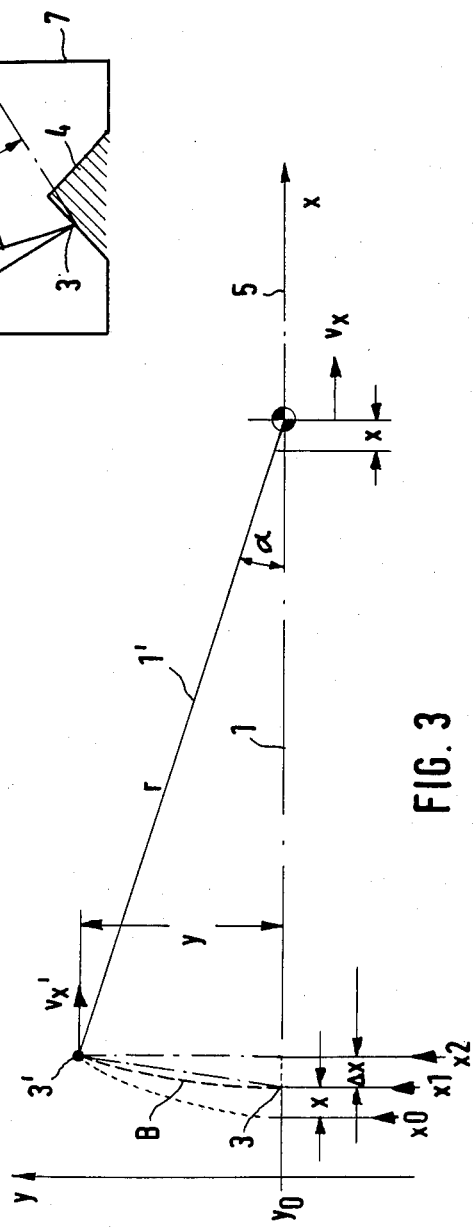

DEVICE FOR MEASURING THE CONTOUR OF A SURFACE ALONG A SCANNING LINE

BACKGROUND OF THE INVENTION

The present invention relates generally to a device (of the type specified in the description of claim 1) for measuring the contour of a surface along a scanning line. Thus, such measuring devices include a transducer with a scanning arm. The scanning arm includes a sensing tip on one end and is pivotally connected to an advance mechanism on the other end. The transducer emits an electrical signal related to the excursion of the sensing tip transducer to a scanning line. The transducer is interconnected to a recording device that records the electrical signal on the basis of distance or time. Such devices may include a sensing tip on the end of a scanning arm. Such devices are well known. The devices have the disadvantage that the sensing tip makes movements not only vertical to the scanning line, but also in the direction of the scanning line in relation to the said pivot bearing of the scanning arm. Since a commonly used recording device, e.g., a paper recording instrument, records at a constant speed, errors occur due to the movements of the scanning tip in relation to the pivot bearing of the scanning arm. In practice, such movement leads to an advance or lag of the scanning tip with respect to a constant advance and thereby to errors in the representation of the contour of the measured surface. Although these errors are smaller the longer the scanning arm is, the scanning arm, for reasons of stability, weight, and vibration strength, cannot be made to just any length.

Electro-mechanical measuring transformers are known in which the sensing tip is on a measuring pushrod that is held in a parallel guide, such as, for example, a ballbearing guide. The mass of such a pushrod, however, is relatively large, so that it is not suitable for rapid scanning and, in particular, is not suitable for accurately scanning the structure of a fine surface.

DE-OS No. 31 52 731 discloses a device for measuring the contour of a surface along a scanning line (according to the descriptive part of claim 1) which is supposed to solve the problem of avoiding measuring errors caused by excursion errors of the scanning arm in the scanning direction. The same is true for DE-PS No. 26 11 476. In the device disclosed in DE-OS No. 31 52 731, the scanning arm pivots with respect to the scanning arm support. The pivot joint of the scanning arm is made movable in a direction that is the advance direction of the arm support. Also provided is a connecting member. One end of the connecting member is supported pivotably by the arm. The other end is pivotably supported by a support on the scanning arm support on the one side or on the opposite side of the surface of revolution of the scanning arm. In the device disclosed as DE-PS No. 26 11 476, a first and a third rod are each connected pivotably with a crosshead guide which moves the scanning arm. A second rod is pivotally connected to the free end of the first and third rods. The scanning arm is fastened to the second rod.

In both these devices, there is thus a compensation of the circular motion of the scanning point on the scanning arm by means of a mechanical compensation. Such mechanical compensation is expensive. Moreover, the burden of the weight increases the inertia of the scanning arm and thus permits only a considerably lower scanning speed.

SUMMARY OF THE INVENTION

An object of the invention is to provide an improved device for the measurement of the contour of a surface along a scanning line. According to the present invention, the measuring errors caused by the excursion errors of the scanning arm in the scanning direction are avoided to a great extent without affecting the scanning speed and without additional mechanical resources.

The problem of providing increased accuracy and speed is solved by the teaching indicated in the characterizing part of claim 1. Thus, for example, a control device may receive signals from the transducer and produces, in response to the magnitude of the electrical signal from the transducer, an advance or lag in the advance mechanism or in the time axis of the recording device relative to the advance of the advance mechanism. The advance or lag is made in a direction and a degree that correspond to movement of the scanning arm caused by the excursion of the scanning arm around the pivot axis.

The invention is based on the principal of compensating the position errors of the sensing tip arising from the excursions of the scanning arm in the direction of the scanning line by means of opposing relative changes in advance. This relative advance change can consist, in one instance, of an advance or lag in the advance or the time axis of the recording device relative to the advance of the advance device for the pivot bearing. Alternatively, the relative advance change can consist of an advance or lag of the advance for the pivot bearing relative to the advance or the time axis of the recording device. This relative change in advance takes place according to the invention on the basis of the electrical measurement voltage provided by the electro-mechanical transducer. Such a voltage is a direct measurement for the excursion of the scanning arm and hence also for the position error. The electrical measurement voltage is fed into a control device which acts on the advance mechanism or the time axis of the recording device or even the advance mechanism for the pivot bearing. The control device may then cause the corresponding compensating relative advance or lag.

The compensation can take place in different ways. One possibility consists (according to the teaching of claim 2) in having the control device for causing the advance or lag periodically increase or decrease the speed of the advance or the recording device or of the advance mechanism for the pivot bearing. Another possibility (according to the teaching of claim 4) consists in having the particular advance run at constant speed and superimposing on this constant advance a compensation motion. The compensation motion is made by having the particular advance motor movable to and fro in the advance direction and coupling it to a regulating device. The regulating device is connected to the control device and moves the advance motor to and fro to produce the advance and lag of the advance.

If the recording device is a serial digital memory, then all that is necessary is to influence the time axis in the same way as the distance axis in the paper recorder and thus compensate for the errors.

BRIEF DESCRIPTION OF THE DRAWING

Preferred embodiments of the present invention are described herein with reference to the drawing.

FIG. 1 schematically shows the operation of a preferred embodiment for measuring the contour of a surface with a scanning arm;

FIG. 2 corresponds to the preferred embodiment shown in FIG. 1 and illustrates the measuring errors to be compensated by the invention;

FIG. 3 shows in detail the relationships in the development of the errors to be compensated for by the invention shown in FIG. 1;

DETAILED DESCRIPTION OF THE PREFERRED EMBODIMENTS

Figure 4:
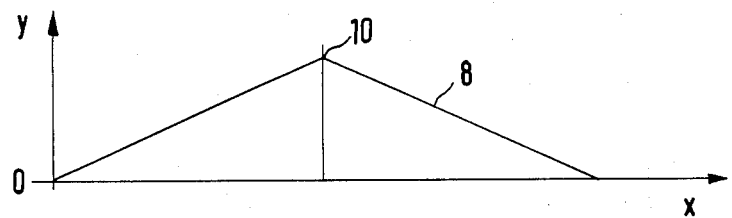
FIG. 4 is a graphical representation of a recording of the surface contour shown in FIG. 1, where the recording is made without errors.

FIG. 1 shows a scanning arm 1, which is shown in interrupted form and is considerably longer than FIG. 1 shows. The scanning arm 1 is attached at its one end by means of a pivot bearing 2 to a not-shown advance mechanism. On its free end there is a sensing tip 3 which rests on a surface contour 4. The surface contour 4 is shown as having a roof-shape for the purpose of the following explanation. The sensing tip moves along a scanning line 5 during scanning. If the excursions of the sensing tip 3 are very small, then no substantial measurement errors result. With greater excursions of the sensing tip 3, it becomes noticeable that the latter moves in an arc around the pivot bearing 2. This is how the errors to be compensated by the invention arise.

FIG. 2 corresponds largely to FIG. 1. In addition, there is shown an advance mechanism 6 on which the pivot bearing 2 is located. Also, the roof-shaped surface contour is located far from central scanning line 5 due to a disturbance 7 shown schematically as a right angle. Thus, the scanning arm 1 is subjected to an excursion from its central position by an angle $\alpha$. With such excursions, the error to be compensated is especially large.

FIG. 3 illustrates the excursion of the scanning arm 1 by an angle upward into a position 1', wherein the sensing tip 3 moves from a position on the scanning line 5 into a position 3'. All parts are incorporated into a coordinate system with the axes x and y.

In the drawing, r = distance from the sensing tip 3 to the pivot bearing 21.

B = arc length between the positions 3 and 3' of the sensing tip. (The voltage obtained from the coil system is proportional to B.)

y = actual profile height.

$\alpha$ = momentary angle of the scanning arm.

$v_x$ = advance speed of the pivot bearing 2.

$v_x'$ = actual speed of the sensing tip 3.

x = distance traversed by the pivot bearing.

$x + \Delta x$ = distance traversed by the sensing tip due to the excursion in the y direction.

x0 = starting x position of the sensing tip x.

x1 = theoretical x position of the sensing tip according to distance x.

x2 = actual x position of the sensing tip according to distance x.

It should be recognized that the secant between the locations of the sensing tips 3 and 3' is very little different from the arc length B due to the relative magnitude of r, so that the electrical measurement voltage emitted by the electro-mechanical transducer attached to the scanning arm 1 has only a very slight measuring error in relation to the y direction transverse to the scanning line 5.

Figure 7:
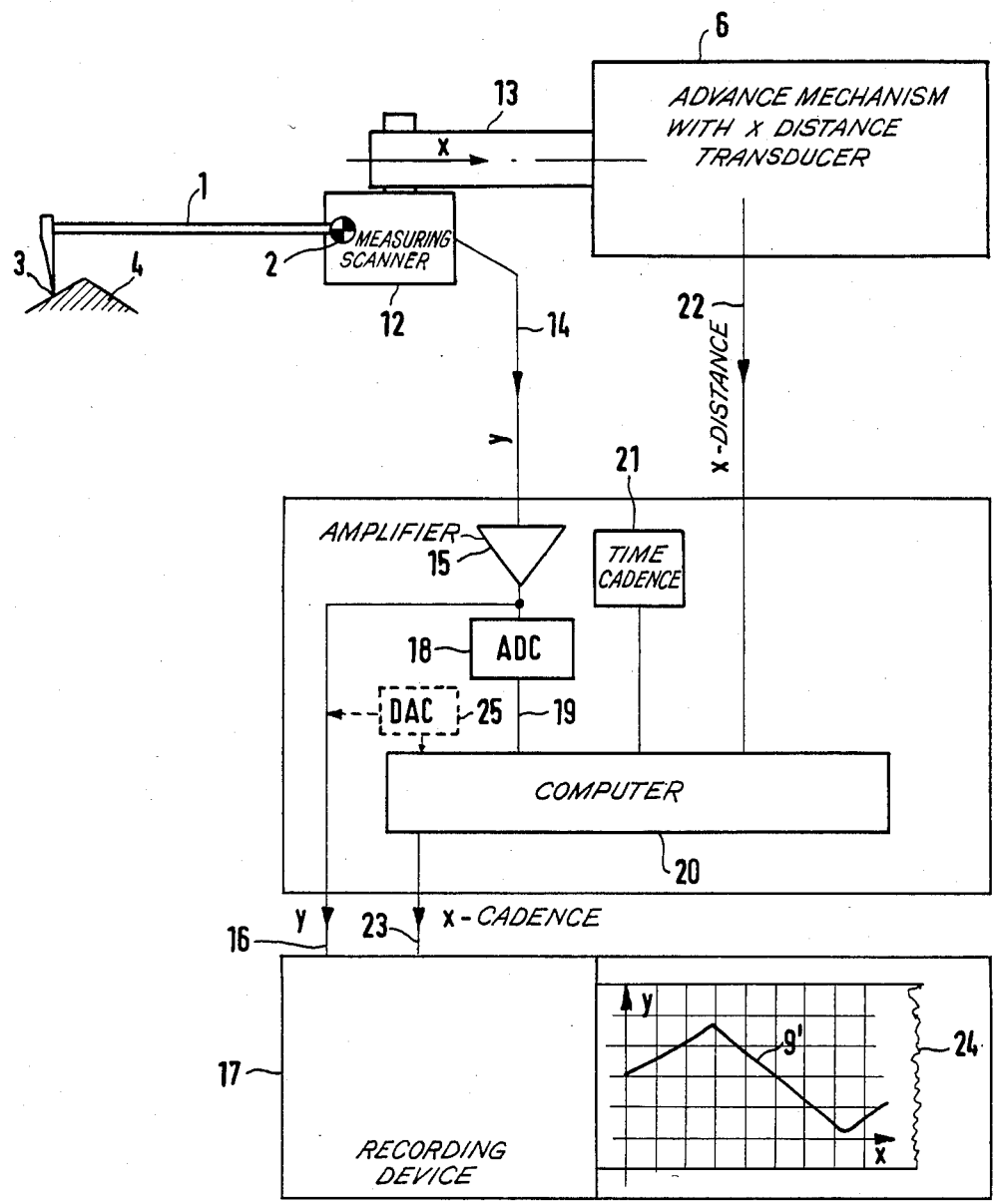
FIG. 7 shows a schematic block diagram of one embodiment of a preferred embodiment shown in FIG. 1.

The distance $\Delta x$ between the points x1 and x2 due to the movement of the sensing tip from position 3 into position 3' is considerably greater and is added to the advance distance x. It is an objective of the invention to compensate the error $\Delta x$. This is done by means of the device according to the invention, which is further explained in FIG. 7.

FIG. 4 shows in a graphic representation, in the same x-y coordinate system as in FIG. 3, but on a different scale, a curve 8. The curve 8 is a recording by a recording device during the scanning of the surface contour 4, as in FIG. 1, without errors.

Figure 5:
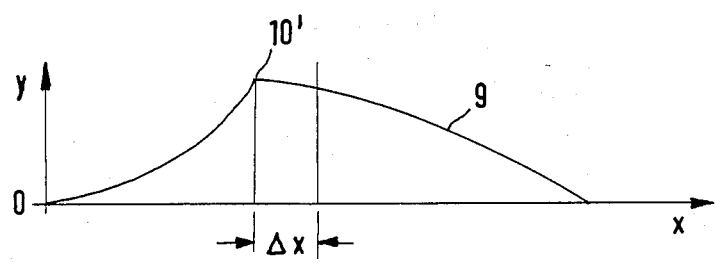
FIG. 5 is a graphical representation illustrating the errors to be compensated by the preferred embodiment shown in FIG. 1.

FIG. 5 shows, in the same coordinate system as FIG. 4, a curve 9 which is generated on the basis of the above-mentioned error $\Delta x$. It was seen in FIG. 3 that, due to the excursion, the scanning point 3 advances in the y direction to the location 3' by the amount $\Delta x$. This advance becomes noticeable in dependence on the excursion angle $\alpha$ at all scanning points (locations). This is especially obvious in the case of a point (peak) 10 of FIG. 4 which is displaced by the amount $\Delta x$ due to the error in FIG. 5.

Figure 6:
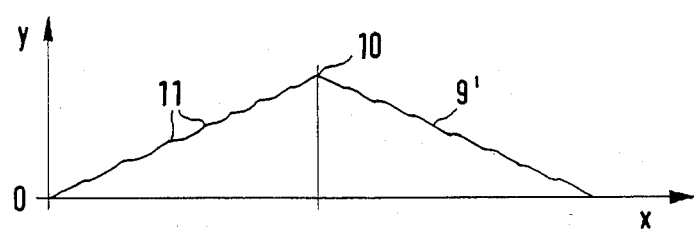
FIG. 6 is a graphical representation showing the recorded surface contour using the compensation of the preferred embodiment shown in FIG. 1.

FIG. 6 shows, in the same representation as in FIGS. 4 and 5, the error-ridden curve 9, after correction, as curve 9'. Small ripples 11 can be seen in this curve 9'. They arise not in an analog but digital method of compensation. As a practical matter, the ripples may be so small that they are not visible.

In the block circuit diagram 7, the surface contour of FIG. 1 is again shown which—as already mentioned—is given for the sake of clarification as a small roof. This surface contour is scanned by the sensing tip 3. The sensing tip 3 is situated on the end of scanning arm 1, which is supported in the pivot bearing 2 mounted in a measuring scanner 12. The measuring scanner 12 is held on a rod 13 which is moved by the advance mechanism 6 with the scanning operation.

The electrical measurement signal of the measuring scanner 12 is fed by a lead 14 to an amplifier 15. The output of the amplifier is fed, by a lead 16, to a recording device 17.

The amplified measurement signal from the amplifier 15 is also fed into an analog/digital transformer 18, so that it reaches a digital computer 20 as a digital signal via a lead 19. This computer receives a time cadence from an impulse generator 21 or, alternatively, in a more accurate form, a distance-based cadence via lead 22 from the advance mechanism 6. One of these freely selected cadences reaches the recording device 17 via a lead 23 as an x cadence and controls its feed for recording paper 24, which is represented schematically.

The computer 20 computes the value $\Delta x$ each time on the basis of the measurement signals supplied via the lead 19 and alters correspondingly the x cadence for the control of the feed for the recording paper 24. The recording paper 24 advances or lags on the basis of the value $\Delta x$. Thus, in the recording, the x error (FIG. 3) arising during the scanning is compensated. Thus the curve 9' as in FIG. 6 appears on the recording paper.

It is, of course, easily possible to also compute the slight errors in the y direction with the computer 20 and thus to correct the y values. In this case, the y values computed and corrected by the computer 20 are fed by way of a digital/analog transformer 25, drawn in dashed lines, to the recording device 17 via lead 16, which are then separated from the amplifier 15.

Instead of the advance of the recording device 17, the advance of the advance mechanism 6 can also be controlled by the computer 20, in order to compensate the scanning errors.

What is claimed is:

1. In a device for measuring the contour of a surface along a scanning line, with an electro-mechanical transducer which has a scanning arm, said scanning arm having a free end with a sensing tip thereon and a second end pivotally connected with an advance mechanism, said pivotal connection including a pivot bearing whose axis of rotation runs parallel to the surface to be scanned and vertical to the scanning line, said advance mechanism moving the pivot bearing along the scanning line, said transducer emitting an electrical signal dependent on the excursion of said sensing tip transverse to the scanning line, said transducer being interconnected to a recording device that records the electrical signal, said electrical signal exhibiting a magnitude, the improvement comprising:

a control device, interconnected to said transducer, for receiving said electrical signal, said control device producing, in response to said magnitude of said electrical signal, a speed adjustment in the advance mechanism in a direction and a degree corresponding to movement of the scanning arm caused by the excursion of the scanning arm around said pivot axis.

2. An improvement as claimed in claim 1, wherein said control device for causing said speed adjustment periodically changes the speed of the advance of the recording device.

3. An improvement as claimed in claim 1, wherein said device for causing said speed adjustment periodically changes the speed of the advance of the advance mechanism.

4. An improvement as claimed in claim 1, wherein said advance mechanism includes a constant-speed drive motor which moves back and forth in the advance direction and is coupled to a regulator which is connected to the control device and moves the advance motor backward and forwards to cause the speed adjustment of the advance mechanism.

5. In a device for measuring the contour of a surface along a scanning line, with an electro-mechanical transducer which has a scanning arm, said scanning arm having a free end with a sensing tip thereon and a second end pivotally connected of the recording device relative to the advance of the advance mechanism, said pivotal connection including a pivot bearing whose axis of rotation runs parallel to the surface to be scanned and vertical to the scanning line, said advance mechanism moving the pivot bearing along the scanning line, said transducer emitting an electrical signal dependent on the excursion of said sensing tip transverse to the scanning line, said transducer being interconnected to a recording device that records the electrical signal, said electrical signal exhibiting a magnitude, the improvement comprising:

a control device, interconnected to said transducer, for receiving said electrical signal, said control device producing, in response to said magnitude of said electrical signal, a speed adjustment in the time axis of the recording device relative to the advance of the advance mechanism in a direction and a degree corresponding to movement of the scanning arm caused by the excursion of the scanning arm around said pivot axis.

6. An improvement as claimed in claim 5, wherein said control device for causing said speed adjustment periodically changes the speed of the advance of the recording device.

7. An improvement as claimed in claim 5, wherein said device for causing said speed adjustment periodically changes the speed of the advance of the advance mechanism.

8. An improvement as claimed in claim 5, wherein said advance mechanism includes a constant-speed drive motor which moves back and forth in the advance direction and is coupled to a regulator which is connected to the control device and moves the advance motor backward and forwards to cause the speed adjustment of the advance mechanism.

* * * * *